(12) United States Patent
Bolle et al.

(10) Patent No.: US 8,180,121 B2
(45) Date of Patent: May 15, 2012

(54) FINGERPRINT REPRESENTATION USING LOCALIZED TEXTURE FEATURE

(75) Inventors: Rudolf Maarten Bolle, Bedford Hills, NY (US); Sharat Suresh Chikkerur, Cambridge, MA (US); Sharathchandra UmapathiRao Pankanti, Manhasset, NY (US); Nalini Kanta Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 12/132,813

(22) Filed: Jun. 4, 2008

(65) Prior Publication Data
US 2008/0232654 A1 Sep. 25, 2008

Related U.S. Application Data

(63) Continuation of application No. 11/472,709, filed on Jun. 22, 2006, now abandoned.

(51) Int. Cl.
*G06K 9/00* (2006.01)

(52) U.S. Cl. ......... 382/124; 382/125; 382/195; 340/5.8; 713/186; 283/68; 345/173

(58) Field of Classification Search .................. 382/124, 382/125; 713/186; 340/5.53
See application file for complete search history.

(56) References Cited

U.S. PATENT DOCUMENTS

| | | | | |
|---|---|---|---|---|
| 7,545,963 B2 * | 6/2009 | Rowe | | 382/124 |
| 7,876,931 B2 * | 1/2011 | Geng | | 382/118 |
| 2001/0036300 A1 * | 11/2001 | Xia et al. | | 382/125 |
| 2002/0070844 A1 * | 6/2002 | Davida et al. | | 340/5.53 |
| 2004/0128521 A1 * | 7/2004 | Russo | | 713/186 |
| 2005/0105783 A1 * | 5/2005 | Moon et al. | | 382/124 |
| 2006/0050933 A1 * | 3/2006 | Adam et al. | | 382/118 |

OTHER PUBLICATIONS

A. M. Bazen et al., A Correlation-Based Fingerprint Verification System: ProRISC2000 Workshop on Circuits, Systems and Signal Processing, Veldhoven, The Netherlands, Nov. 2000; pp. 1-8.

James R. Bergen et al.,"Computational Modeling of Visual Texture Segregation" Computational Models of Visual Processing; 1999; pp. 253-271.

Anil Jain el al., "On-Line Fingerprint Verification" Pattern Analysis and Machine Intelligence, vol. 19; 1997 pp. 302-313.

J.G. Daugman, "High confidence Visual Recognition of Persons by a Test of Statistical Independence", Transactions on PAMI, 15(11) pp. 1148-1161, 1993.

J.G. Daugman, "Complete Discrete 2-D Gabor Transforms by Neural Networks for Image Analysis and Compression", IEEE Transactions on Acoustics, Speech and Signal Processing vol. 36. No. 7, Jul. 1988; pp. 1169-1179.

Anil K. Jain et al.,"Filterbank-Based Fingerprint Matching" Transactions on Image Processing, vol. 9 pp. 846-859; May 2000.

Anil K. Jain et al., "Fingerprint Matching Using Minutiae and Texture Features", International Conference on Image Processing; pp. 282-286, Oct. 2001.

T.S. Lee, "Image Representation using 2d gabor wavelets", Transations on PAMI, 18 (10: pp. 959-971; 1996.

(Continued)

*Primary Examiner* — Vanel Frenel
(74) *Attorney, Agent, or Firm* — Tutunjian & Bitetto, P.C.; Preston J. Young, Esq.

(57) ABSTRACT

A system and method for processing fingerprints includes representing each minutiae in a fingerprint by determining quantized Gabor coefficients to represent texture content of the minutiae. A distance is computed between represented minutiae and stored minutiae. The minutiae matches are ranked based on the distance to identify the fingerprint.

20 Claims, 8 Drawing Sheets

OTHER PUBLICATIONS

Seung-Hyun Lee et al., "Fingerprint Identification by Use of Volume Holographic Optical Correlator" SPIE Optical Pattern Recognition, vol. 3715, pp. 321-325; Mar. 1999.

K. Nandakumar et al., "Local Correlation-based Fingerprint Matching", Indian Conf. on Computer Vision, Graphics and Image Processing, pp. 503-508, 2004.

N. K. Ratha et al, "A Real-Time Matching System for Large Fingerprint Databases" Transactions on Pattern Analysis and Machine Intelligence, 18(8) pp. 799-813; 1996.

Danny Roberge et al., "Optimal-Trade-off Filter for the Correlation of Fingerprints" Optical Engineering, 38(1) pp. 108-113, 1999.

Kenneth Nilsson et al., "Complex Filters Applied to Fingerprint Images Detecting Prominent Symmetry Points Used for Alignment" Biometric Authentication, LNCS2359, pp. 39-47, 2002.

Colin Soutar et al., "Biometric Encryption Using Image Processing", SPIE, vol. 3314; pp. 178-188; 1998.

Alex Stoianov et al., "High-speed Fingerprint verification using an optical correlator" Opt. Eng. 38(1) pp. 99-107; Jan. 1999.

Anil K. Jain et al., "FingerCode: A Filterbank for Fingerprint Representation and Matching", IEEE; 1999; pp. 187-193, 1999.

Asker M. Bazen et al., "Systematic Methods for the Computation of the Directional Fields and Singular Point of Fingerprints" IEEE; pp. 905-919; 2002.

K. Nilsson et al., "Localization of corresponding points in fingerprints by complex filtering" Pattern Recognition Letters, 24, 2003; pp. 1-11.

A.M. Bazen et al., "Extraction of singular points from directional fields of fingerprints" Mobile Communications in Perspective,, Annual CTIT Workshop, The Netherlands, Feb. 2001; 4 pages.

* cited by examiner

FINGERPRINT REPRESENTATION USING LOCALIZED TEXTURE FEATURE

RELATED APPLICATION INFORMATION

This application is a Continuation application of U.S. patent application Ser. No. 11/472,709 filed on Jun. 22, 2006, now abandoned incorporated herein by reference in its entirety.

BACKGROUND

1. Technical Field

The present invention relates to fingerprint processing and more particularly to a system and method for employing Gabor coefficients in a texture representation for fingerprint recognition.

2. Description of the Related Art

Biometric identifiers, such as, fingerprints, face, iris and voice prints, offer a way of reliable personal authentication. Biometrics is rapidly replacing traditional token and password methods. Of all the biometric modalities, fingerprints have emerged as a popular choice due to their universality, distinctiveness, permanence and acceptability. Another reason for their popularity is the wide variety of implementations of recognition algorithms that are already available.

Existing fingerprint matching algorithms may be broadly classified into the following categories based on fingerprint representation.

1. Correlation based: In this representation, the fingerprint image itself is used as a template. Matching is performed by measuring the result of cross correlation between the two images. This requires reasonably low resolution images and is very fast, since correlation may also be implemented through optical techniques. However, the matching is global and requires an accurate registration of the target and reference fingerprint images, since correlation is not invariant to translation and rotation. The accuracy of correlation based techniques further degrades with non-linear distortion of the fingerprint.

2. Minutiae Representation: Minutiae represent local fingerprint ridge discontinuities and mark the position where a ridge comes to an end or bifurcates into two. Given target and reference fingerprints and their corresponding minutiae features, the process of matching is a point pattern matching problem. This is by far the most popular approach to fingerprint recognition. However, minutiae based matching algorithms do not perform well in the case of small fingerprints that have very few minutiae. Furthermore, minutiae based systems completely ignore gray scale content of the fingerprint images. Human experts routinely utilize the rich structural and texture cues present in the fingerprint image during the process of matching. Minutiae based representations do not encode this information either explicitly or implicitly.

3. Texture Descriptors: A fingerprint image can also be viewed as a pattern of oriented texture formed by the gray scale variation of the ridges. Therefore, texture descriptors provide a good representation for the ridge content in the image. A global texture descriptor scheme called 'finger code' utilizes both global and local ridge descriptions. The features are extracted by measuring the responses of radial fingerprint image sectors to a filterbank. The matching is based on measuring the Euclidean distance between the feature vectors. A disadvantage of this approach is that it requires that the fingerprint core is accurately located. This is a difficult problem in itself.

Thus, algorithms based on minutiae require a point matching algorithm, but do not measure gray scale content. On the other hand, correlation and texture based methods measure gray scale content but require very accurate alignment. Another issue with the above mentioned techniques is that of scalability. It has been shown that algorithms designed for 1:1 verification scale poorly when used for 1:N identification tasks.

Fingerprint recognition based on localized information selects 'interesting' regions in the fingerprint image to perform local gray scale correlation. Plain ridges do not carry any information except their orientation, ridge frequency, ridge endings and ridge bifurcations. The 'interesting' regions (similar to distinctive minutiae configurations) include regions around the minutiae, regions of high curvature and regions around the singular points such as core and delta. However, the optimal process of selecting these 'interesting' regions is very inefficient. Furthermore, the algorithm is not robust to rotations. Localized correlation is used in other methods, but only in conjunction with a geometry based minutiae matcher. The localized correlation is used to assess the quality of the pairs obtained by the minutiae matcher. The localized correlation itself is not accurate enough to be useful. Furthermore, the algorithms are designed for 1:1 verification and are therefore not directly scalable for large scale identification tasks.

SUMMARY

A system and method for processing fingerprints includes representing each minutiae in a fingerprint by determining quantized Gabor coefficients to represent texture content of the minutiae. A distance is computed between represented minutiae and stored minutiae. The minutiae matches are ranked based on the distance to identify the fingerprint.

Another method for processing fingerprints includes inputting a fingerprint image, identifying minutiae in the fingerprint image, computing Gabor coefficients to represent texture content of each minutiae in the fingerprint, and quantizing the Gabor coefficients for storage in memory.

A system for processing fingerprints includes an input device configured to receive fingerprint images, an extraction module configured to determine minutiae in the fingerprint, and a representation module configured to compute Gabor coefficients to represent texture content for each minutiae to represent the fingerprint. A comparing module computes a distance between represented minutiae in the fingerprint and stored minutiae in memory to rank matches based on the distance to associate an identify with the fingerprint.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments in accordance with present principles provide representations of localized texture features and outline dimensionality reduction for use in fingerprint identification. Fingerprint representations can be broadly divided into three categories: gray scale image level, texture derived features and minutiae features. Both image based and texture based representations need accurate alignment before comparison. This presents a problem since accurate localization of singular points and registration of fingerprints is still a pertinent problem in this field.

On the other hand, minutiae based matchers are invariant to changes in orientation and position, but completely ignore the rich gray scale content in the image. In accordance with present principles, a localized texture based representation system and method are provided that rely on gray scale content for identification and at the same time do not need absolute alignment. Techniques to efficiently compute these features and methods to perform identification based on these features are provided. Experimental evaluations are also presented on databases of several sizes that show that the features are both accurate and scalable.

Embodiments of the present invention can take the form of an entirely hardware embodiment, an entirely software embodiment or an embodiment including both hardware and software elements. In a preferred embodiment, the present invention is implemented in a combination of hardware and software. The software may include but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1A:
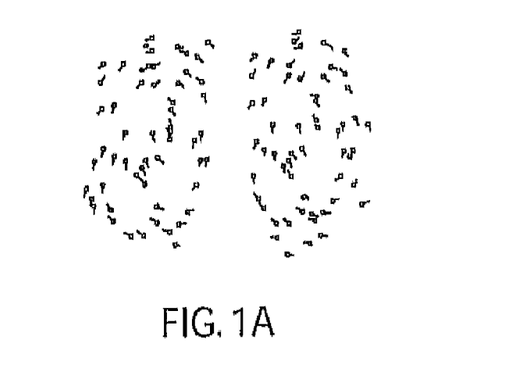
FIG. 1A is an image showing relative geometry used for minutiae based matchers.
Figure 1B:
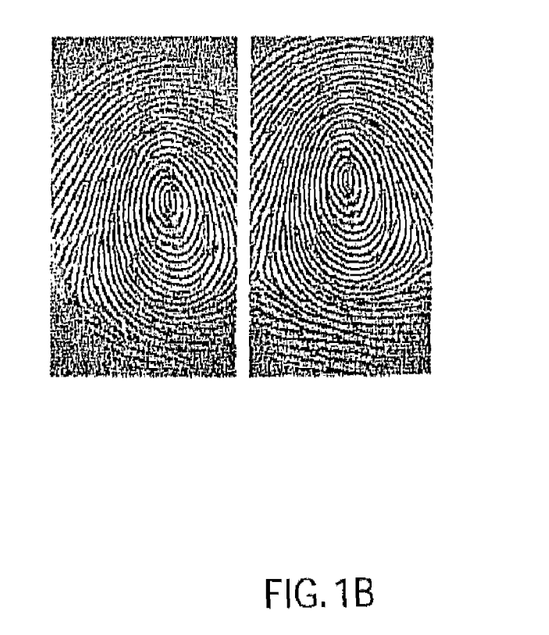
FIG. 1B is an image showing the gray scale image content used in correlation and texture based matchers.

Referring now to the drawings in which like numerals represent the same or similar elements and initially to FIGS. 1A and 1B, images are illustratively shown to demonstrate the differences between minutiae based matchers (FIG. 1A) and correlation and texture based matchers (FIG. 1B). In FIG. 1A, minutiae are depicted. Minutiae based matchers rely on relative geometry but do not need to be fully aligned. Correlation and texture based matchers rely on gray scale content as shown in FIG. 1B, but require alignment.

Embodiments in accordance with the present principles provide a local texture based representation scheme that relies solely on gray scale content and at the same time does not require absolute alignment. Using these features, a system and method for identification is provided. It is to be noted, that the method performs 1:N (scaling) matching.

Localized texture features: To obtain position and rotation invariance, localized texture features are relied upon instead of relying on global descriptions. The texture is quantified within the local vicinity of each minutiae, and this evidence is collected across all minutiae during identification. While this information is most useful when combined with the geometrical information given by the minutiae, as a first step and also to measure the relative merit of the new features, identification is performed exclusively on texture features. While most minutiae are not distinctive, there are highly distinctive minutiae that convey a lot of information about the identity of the fingerprint itself (See, e.g., FIGS. 1A and FIG. 1B). Experimental evidence to be described hereinafter proves that such an approach is effective.

Texture Representation: A multi-resolution representation using a Gabor expansion in accordance with present principles is employed to represent a minutiae neighborhood. The bases are derived using self-similar Gabor elementary functions computed at multiple scales and orientations.

The present principles represent fingerprint images with rotationally invariant indices derived from local function expansions around fingerprint image landmarks. An example of such function expansions includes Gabor function expansions. The function expansions may be optionally transformed to make the representation revocable and anonymous to preserve privacy. This includes that the coefficients, and therefore, the biometrics are transformed with a non-invertible, revocable transform.

If for some reason the coefficients are compromised: (1) the real (untransformed) coefficients cannot be recovered because the transform is non-invertible (and moreover secret). Therefore, the true biometric cannot be reconstructed.

But also (2) the coefficients can be transformed with a new non-invertible, revocable transform and the subject can be re-enrolled. It is similar to, e.g., the cancellation of a credit card. A new number (biometric) is given and at the same time your true biometric is not compromised since it was previously transformed anyway.

Every person in the database could have his/her biometric transformed so that the true biometric is not exposed. It is better to keep the transform secret, but even if the transform is compromised, because of the non-invertibility, the biometric cannot be reconstructed. If the transform is invertible, the transform has to be kept secret. The transform is revocable because a subject can at any time be re-enrolled with a new transform.

Existing fingerprint indexing solutions use more global invariant features such as fingerprint pattern class or geometric primitives such as line segments and triangles with associated ridge counts. Drawbacks of these methods include that they offer small penetration rates (i.e., fraction of the prints filtered out due to indexing is small) or are overly complex.

Figure 2A:
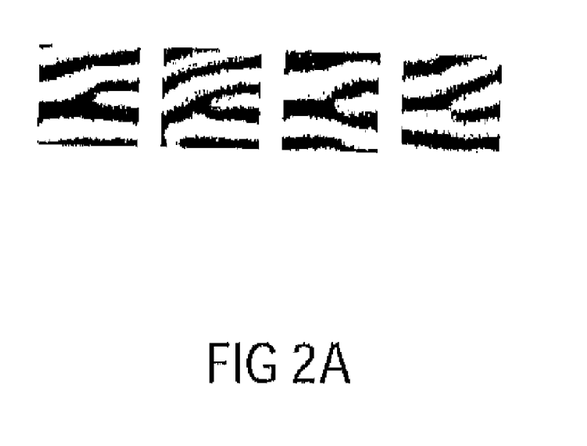
FIG. 2A shows gray scale images of illustrative flow pattern configurations.
Figure 2B:
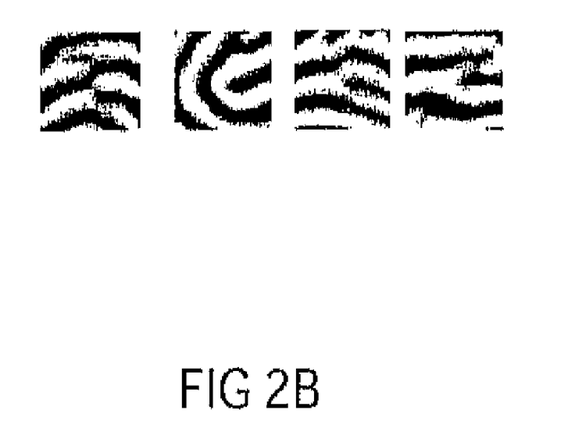
FIG. 2B shows gray scale images of illustrative highly distinctive flow pattern configurations.

Referring to FIGS. 2A and 2B, minutiae configurations are shown for common minutiae configurations (FIG. 2A) and for highly distinctive minutiae configurations (FIG. 2B).

The present embodiments compose invariant indices from novel minutiae features where the features may be distorted for privacy reasons. The system and method includes two phases, e.g., enrollment and identification. These two phases may be illustratively summarized as follows.

Enrollment:
1. Process the fingerprint image(s) of an individual to obtain the minutiae.
2. For each (one or more) minutiae: a. Obtain (Gabor) function expansion features from the minutiae neighborhood(s). b. Optionally distort the expansion coefficients with a secret, revocable transformation. c. Prepare an index from the (distorted) minutiae features. d. Store the person identity (and possibly other minutiae information) in the entry indicated by the index of an enrollment table.

Identification:
a. Initialize evidence for the enrolled identity or identities to zero. b. Obtain the minutiae from query fingerprint(s) of an unknown individual to be recognized.
c. For each (one or more) minutiae: 1. Obtain (Gabor) function expansion features from the minutiae neighborhoods) 2. Optionally distort the expansion coefficients with the same secret transformation. 3. Prepare an index from the (distorted) minutiae features. 4. Retrieve the identity or identities stored in the entry indicated by the index of the enrollment table. 5. Obtain the match score of the query and indexed minutiae.
d. Determine the N minutiae with the highest match scores and use these to accumulate evidence for the associated identities. e. One or more identities corresponding to the highest evidence are returned as candidate identities.

Figure 3:
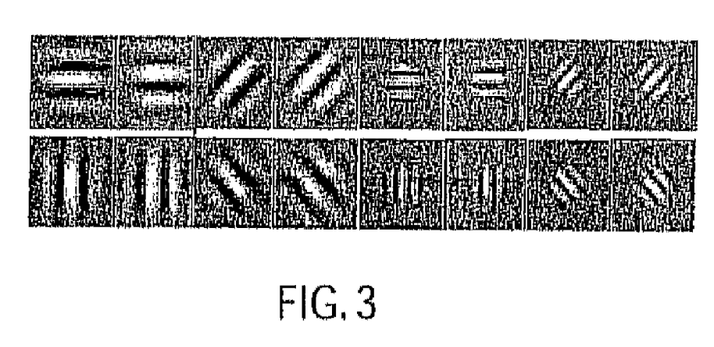
FIG. 3 shows image representations of Gabor basis functions used to represent minutiae neighborhoods.

Referring to FIG. 3, some of the Gabor basis functions used to derive local feature representations are visually depicted. These representations are chosen since Gabor elementary functions have important signal properties such as optimal joint space frequency resolution. Gabor elementary functions form a very intuitive representation of fingerprint images since they capture the periodic, yet non-stationary nature of the fingerprint regions. Furthermore, apart from being a good representation for texture information, Gabor elementary functions also form a very good sparse representation for image representation. Gabor elementary functions have been employed as basis functions to represent generic 2D images.

The following form of the 2D-Gabor elementary function, may be given:

$$G(x, y) = \exp(-\pi[(x-x_0)^2\alpha^2 + (y-y_0)^2\beta^2])\exp(-2\pi i[u_0(x-x_0) + v_0(y-y_0)]). \quad (1)$$

Here $x_0$ and $y_0$ represent the center of the elementary function in the spatial domain. $u_0$ and $v_0$ represent the modulation frequencies. $\alpha^2$ and $\beta^2$ represent the variance along the major and minor axes respectively, and therefore the extent of support in the spatial domain. A 32×32 gray scale region is represented around a fingerprint minutiae using basis functions that span two scales and four orientations resulting in 272 coefficients (25+9=34 positions and four orientations for each position and 2 (real+imaginary) components for each coefficient). The gray scale image can therefore approximately be represented using:

$$I(x, y) = \sum_{n=1}^{136} a_n G_n(x, y) \quad (2)$$

The basis function at scale m, displacement $(p,q) \in (0, 2^m, 2^{2m} \ldots, N)$ and orientation $\theta$ is given by:

$$\Psi_{mpq\theta}(x, y) = 2^{-m} G(x', y') \quad (3)$$

$$x' = 2^{-m}[x\cos(\theta) + y\sin(\theta)] - p \quad (4)$$

$$y' = 2^{-m}[-x\sin(\theta) + y\cos(\theta)] - q \quad (5)$$

Figure 4:
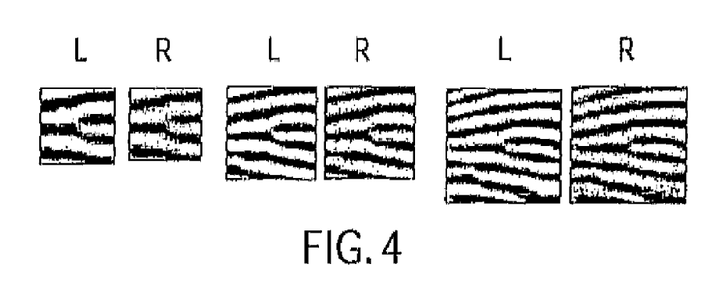
FIG. 4 shows gray scale images of minutiae neighborhoods reconstructed in accordance with present principles.

Referring to FIG. 4, examples are shown of normalized gray scale minutiae neighborhoods and their approximate reconstructions using Gabor expansion. In FIG. 4, a left image (L) shows the original minutiae neighborhood and a right image (R) shows the reconstructed minutiae neighborhood. Three pairs of images are illustratively shown. The almost perfect reconstruction supports the choice of Gabor basis functions for the gray scale image content representation.

Computing Gabor Expansion: Unlike Fourier bases or discrete cosine bases, Gabor elementary functions have the following problems. (1) From a signal processing point of view, Gabor elementary functions do not form a tight frame. This means that the gray scale image is not represented as a linear superposition of Gabor elementary functions with coefficients derived by projecting the gray scale image onto a set of basis functions. However, conditions have been established under which a set of self-similar Gabor basis functions form a complete and approximately orthonormal set of basis functions. (2) Gabor elementary functions form biorthogonal bases. This means that the basis functions used to derive the coefficients (analysis functions) and the basis functions used to reconstruct the image (synthesis functions) are not identical or orthogonal to each other. However, there are several ways in which an optimal solution in the mean square sense can be obtained.

Gradient Descent: A simple optimization approach has been devised to obtain the coefficients (See Daugman, "Complete Discrete 2D Gabor Transform by Neural Networks for Image Analysis and Compression, Transactions on Acoustics", *Speech and Signal Processing*, 36:1169-1179, 1988, incorporated herein by reference). This approach tries to minimize the squared difference between the reconstructed and the original image. In other words, the approach tries to minimize the function:

$$\varepsilon(a_1, a_2 \ldots, a_N) = \sum_{x,y} \left\{ I(x, y) - \sum_{k}^{N} a_k G_k(x, y) \right\}^2 \quad (6)$$

The optimal coefficients may be obtained by a gradient descent approach as suggested by Daugman. At each iteration the coefficient is incremented by an amount:

$$\Delta a_n = G_n(x, y) \cdot I(x, y) - G_n(x, y) \cdot \left( \sum_k G_k(x, y) I(x, y) \right) \quad (7)$$

Once the coefficients are computed, the coefficients are quantized using $\hat{a}$=sign(a), which returns the sign of the corresponding element a. This is inspired by a similar representation used to quantify texture in iris images (See, e.g., Daugman, "High Confidence Visual Recognition of Persons by a Test of Statistical Independence", *Trans. on PAMI*, 15(11): 1148-1161, 1993.

However, this representation is further optimized in accordance with present principles based on studies in visual perception. In our preliminary experiments, we manually identified corresponding minutiae in a small set of pairs of fingerprints and computed the Hamming distance between corresponding and non-corresponding minutiae.

Figure 5:
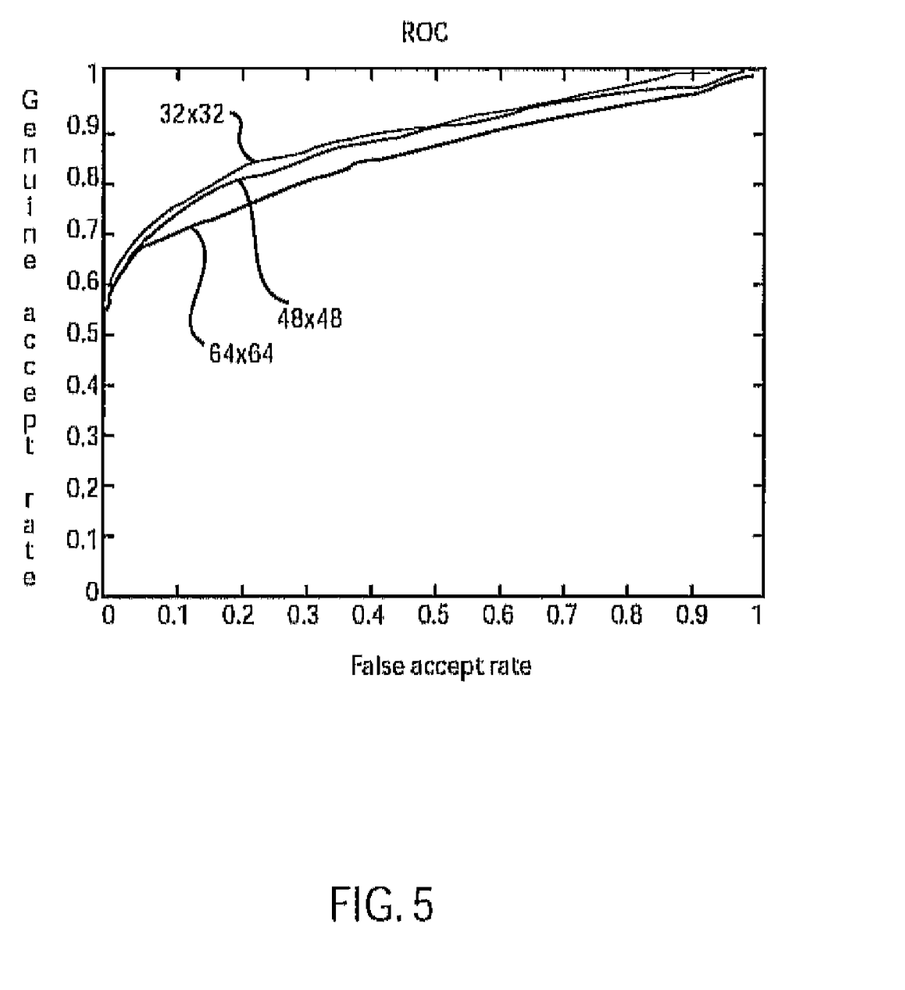
FIG. 5 is a receiver operating characteristic (ROC) curve obtained by matching pairs of single minutiae and showing the effect of neighborhood sizes.

Referring to FIG. 5, a Receiver Operating Characteristic (ROC) curve shows that the proposed features are very discriminative. It is to be noted that this ROC is based on comparison between single minutiae. It is therefore very likely that good discrimination will be achieved by pooling evidence from multiple minutiae within the fingerprint. As seen from FIG. 5, the neighborhood size plays a role in the feature discriminatory powers. Curves for 32×32, 48×48 and 64×64 neighborhoods are depicted. 32×32 neighborhoods are preferably selected based on this preliminary observation.

Figure 6:
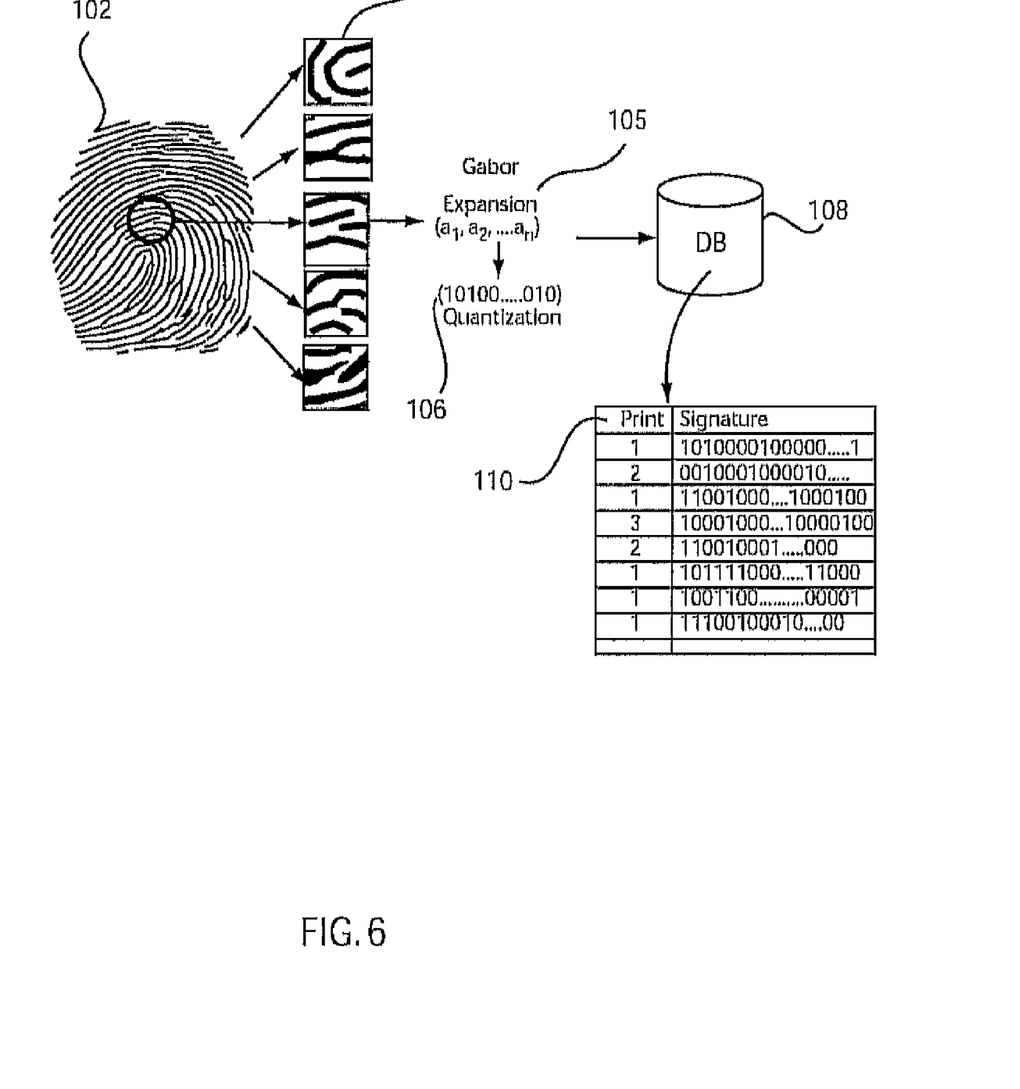
FIG. 6 is a diagram showing enrollment of fingerprints into a database using Gabor features/coefficients in accordance with one embodiment.

Referring to FIG. 6, an overview of the enrollment process is illustratively depicted. A fingerprint 102 to be enrolled is preprocessed using an enhancement scheme known in the art to make the features robust to variable acquisition conditions. Then, minutiae detection is performed to identify the location and orientation of all the points of interest 104 within the fingerprint 102. Subsequently, Gabor expansions 105 in 32×32 neighborhoods around the minutiae are extracted and normalized based on the minutiae's orientation. Fingerprint distortion transformations may be applied for security to the Gabor features/coefficients. The Gabor features/coefficients are quantized 106 and stored in a database 108 along with the fingerprint's associated identity 110.

Identification: During identification, the quantized Gabor expansion coefficients/features 106 are extracted similar to the enrollment process. To identify the candidate fingerprint in the database, evidence is pooled from results of all the minutiae from the query print. The method is outlined below with reference to FIG. 7.

Figure 7:
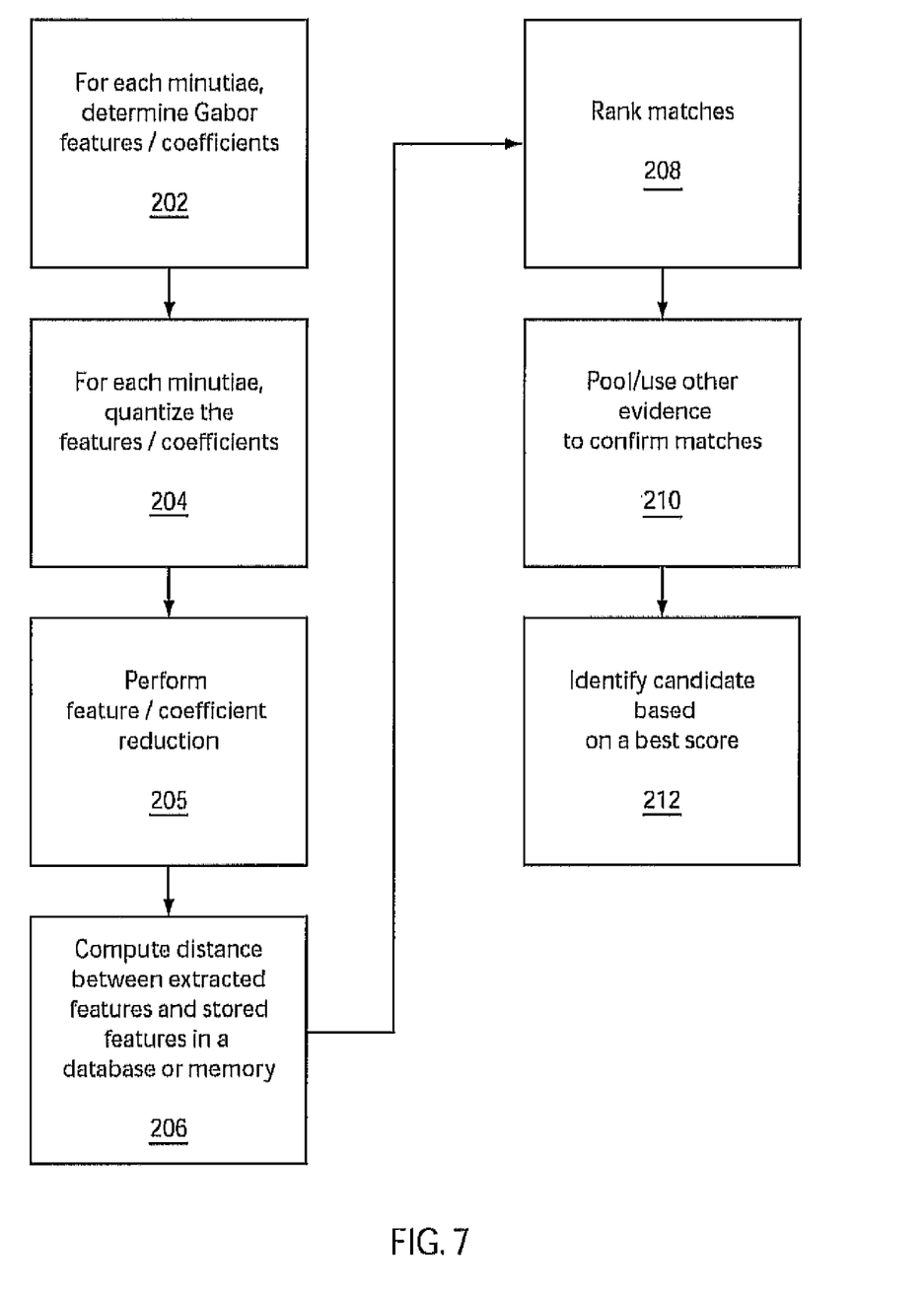
FIG. 7 is a block/flow diagram showing identification of fingerprints using Gabor features/coefficients in accordance with another embodiment.

Referring to FIG. 7, an identification method in accordance with the present principles is illustratively depicted. For each minutiae in a query print Q: in block 202, extract the Gabor coefficients/features $a_1, a_2, \ldots, a_n$ from the print. This may include fingerprint distortion transformations by altering the Gabor features/coefficients. The print may be distorted in accordance with the same transformation employed in the enrollment phase. In block 204, quantize the Gabor coefficients/features.

In block 205, perform a feature or coefficient reduction to reduce the number of coefficients. In block 206, compute a distance (e.g., the Hamming distance) between the extracted features and all the minutiae in the database. In block 208, rank the minutiae matches in increasing order of distance, i.e., a candidate minutiae with the smallest Hamming distance has the rank of 1. In block 210, for each candidate minutiae with rank K (for simplicity consider only K≦10 candidates), pool and/or use evidence about the candidate's identity. If the candidate minutiae have associated identity ID(K) increment the evidence for this ID by (10-K+1). Thus, the top most candidate's ID gets a score of 10 and the 10th best ID gets a score of 1. In block 212, the candidate identities based on total scores are listed.

The identification method of FIG. 7 has a complexity of O(mNlogN) where m is the number of minutiae in the query print and N is the number of minutiae in the database. While this may seem very complex, the binary features and simple Hamming distance metric make it computationally very feasible.

Feature Reduction: Gabor responses are computed from every minutiae region. In one illustrative embodiment, every 32×32 pixel minutiae window may have 9 large filter (low frequency) positions and 25 small filter (high frequency) components. For each filter response, four orientations exist. Each response has a real and imaginary component. Thus, a 272-bit binary representation is generated. A typical fingerprint has on average 50-80 minutiae. This can result in a very large representation when the features are accumulated over a large database of fingerprints.

As in block 205, the number of coefficients may be investigated to reduce the number without loss of accuracy. In one embodiment, the features are computed at two resolution levels. A first experiment focused on reducing the levels to only one resolution level. Note that the coefficients are distributed unevenly in the two levels. Even in one level, we focused further to reduce the features by limiting the focus it to peak response in a particular orientation. The results of these experiments are presented below in terms of cumulative match curves (CMCs) on a public database. Thus, 72-bit, 54-bit and 18-bit representations are provided in addition to the original 272-bit representation.

Figure 8:
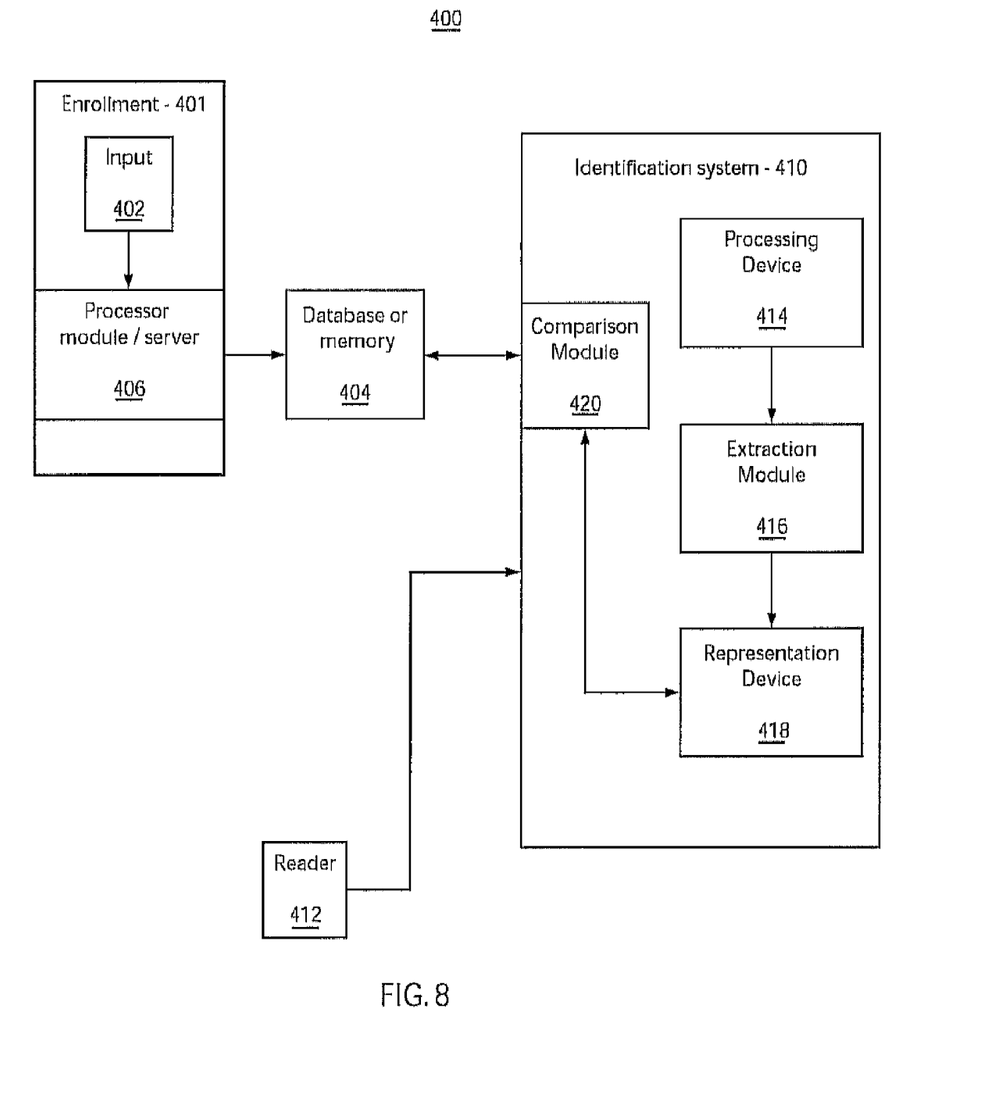
FIG. 8 is a block/flow diagram showing a system for enrollment and identification of fingerprints using Gabor features/coefficients in accordance with another embodiment.

Referring to FIG. 8, a system 400 creating a database of fingerprint recognition (enrollment 401) and identification of fingerprints (identification 410) is illustratively shown in accordance with present principles. Portions 401 and 410 may be separate systems, but are depicted together for simplicity. System 400 includes an input device 402 for enrollment. Input device 402 may include a fingerprint scanner or other device for inputting fingerprints into a database 404. A processor module or server 406 may be employed along with database 404 to preprocess fingerprints to perform known fingerprint enhancements and quantizations in accordance with present principles as described for enrollment hereinabove.

An identification module or system 410 includes a fingerprint reader 412. Reader 412 may be located on any device where security access is desirable. Alternately, fingerprint images may be input electronically to module 410 or using input 402. System 410 may be included on a device 412 such as a computer system, an electronic device, a keypad or at an entranceway to a location or anywhere else fingerprint recognition would be useful. Module 410 may also be employed in a law enforcement capacity for identifying fingerprints found at a crime scene, or to simply match a fingerprint with an identity for other purposes.

Module 410 may include a processing device 414 for processing the input fingerprint for comparison to the database 404. The processing device 414 includes an extraction module 416 configured to identify minutiae in the print image. Device 414 further includes a representation module 418 configured to determine Gabor coefficients for each minutiae in the print (for texture content, e.g., gray scale, for identification), and quantize the Gabor expansion for comparison to prints representations stored in memory or database 404. Device 414 further includes a comparison module 420 which may be included in the database 404 to determine candidate matches.

In one embodiment, database 404 may be replaced by a memory device where fewer prints are stored for comparison. In addition, processing device 414 may be omitted if processing can be performed by processor module 406. Optional distortions of the expansion coefficients with a transformation may be applied in both the enrollment and identification phases.

Experimental Evaluation: Recall that for an identification query, the n-bit (n=272, 72, 54 or 18) representations of the minutiae of the query fingerprint are computed. Each of these bit strings is compared against all the bit strings associated with all the minutiae of the enrolled fingerprint database. A candidate list is constructed by ranking the enrolled fingerprint database based on the cumulative score of all the sets often ranked identities (e.g., fingerprints in the enrollment database).

Figure 9A:
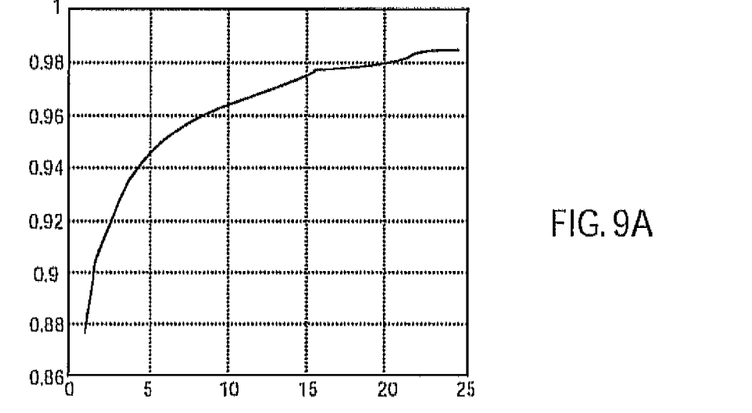
FIGS. 9A-9C are loose (FIGS. 9A and 9C) and strict (FIG. 9B) Cumulative Match Curves (CMCs) for identification of fingerprints using Gabor features/coefficients in accordance with present principles.
Figure 9B:
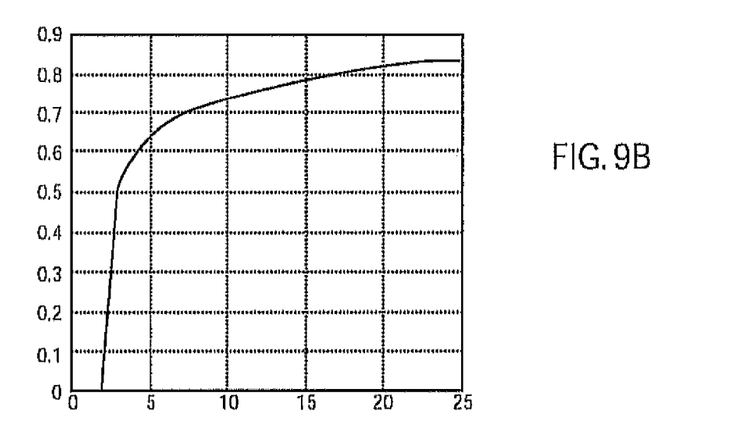
Figure 9C:
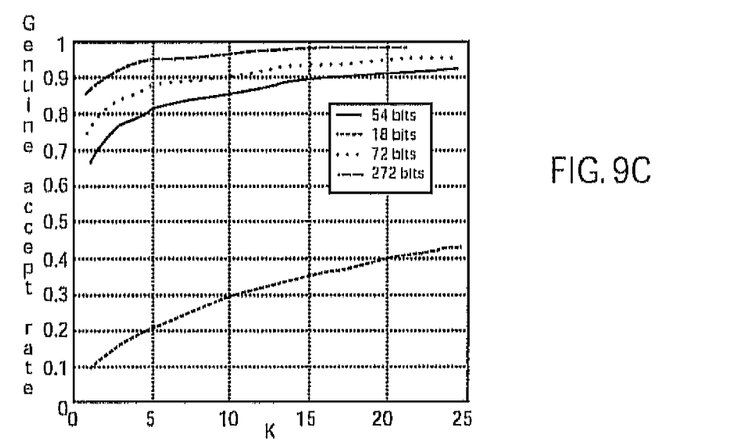

Experiments have been conducted on the FVC2002 DB1 and DB2 databases. Both databases are obtained from 110 fingers with 8 impressions each. Thus, each database includes 880 fingerprint images. The performance is measured using the Cumulative Match Curve (CMC), focusing on the top 10 ranking identities. To test the performance on a large dataset, all the fingerprints in DB1 and DB2 were combined in one database. This combined dataset hence includes 1760 fingerprints. The CMC of FIG. 9 plots the probability of identification against a candidate list of size K. The plot indicates the probability that the correct identity appears in different sized candidate lists. The faster the CMC approaches 1, say at $K_0$, the better the identification algorithm is. This means that the correct identity always appears in the candidate list of size $K_0$. However, since there are 8 impressions of each finger enrolled in the database, the CMC needed to be modified as follows.

Let n be the number of impressions of a finger in the enrollment database, where n does not include the query print. Let TOP-K be the candidate list of size K. Further, for a given identity denoted as P, let n impressions of P in the database be $P_1, \ldots, P_n$. Then we define:

1. A Loose CMC curve: A finger P appears in the TOP-K if and only if there exists a j such that $1 \leq j \leq n$ with $P_j \in$ TOP-K. (The traditional CMC curve is a loose CMC curve with n equal to 1.)

2. A strict CMC curve: Given some Q, with $1 \leq Q \leq \min(n, K)$, an identity P appears in the TOP-K if and only if at least Q impressions of P, $P_{j1}, \ldots, P_{jq}$ appear in the top K.

Referring to FIGS. 9A-9C, the accuracy performance of the presentation and the identification methods described above are illustratively shown. FIG. 9A shows a loose CMC plot for the identification method. FIG. 9B shows a strict CMC plot for the identification method.

In FIG. 9C, 18-bit, 54-bit, 72-bit and 272-bit representations are shown for the identification method in accordance with the present principles. Note that the 72-bit and the 54-bit representations are quite good considering that the representation is a mere fraction of the original 272-bit representation. However, the 18-bit representation has poorer results with significant loss of accuracy.

Having described preferred embodiments of a system and method for fingerprint representation using localized texture features (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for processing fingerprints, comprising:
 representing each minutiae in a fingerprint by determining quantized Gabor coefficients to represent texture content of the minutiae;
 computing a distance between represented minutiae and stored minutiae using a processor; and
 ranking minutiae matches based on the distance to identify the fingerprint.

2. The method as recited in claim 1, further comprising pooling evidence related to the fingerprint to assist in confirming the identity.

3. The method as recited in claim 1, wherein computing includes computing a Hamming distance.

4. The method as recited in claim 1, further comprising listing candidate identities based on a score.

5. The method as recited in claim 1, wherein representing includes computing Gabor elementary function coefficients and the minutiae are represented using the coefficients.

6. The method as recited in claim 1, further comprising optimizing the Gabor coefficients using a gradient descent approach.

7. The method as recited in claim 1, further comprising reducing the number of Gabor coefficients to reduce the representative size of the print.

8. The method as recited in claim 1, wherein representing includes representing each minutiae based on a 32 by 32 neighborhood of pixels.

9. A method for processing fingerprints, comprising:
 inputting a fingerprint image;
 identifying minutiae in the fingerprint image;
 computing Gabor coefficients to represent texture content of each minutiae in the fingerprint using a processor; and
 quantizing the Gabor coefficients for storage in memory.

10. The method as recited in claim 9, further comprising storing evidence related to the fingerprint to assist in confirming the identity.

11. The method as recited in claim 9, wherein computing Gabor coefficients includes optimizing Gabor coefficients using a gradient descent approach.

12. The method as recited in claim 9, further comprising reducing the number of coefficients to reduce the representative size of the fingerprints.

13. The method as recited in claim 9, wherein each minutiae in the image is represented by a 32 by 32 neighborhood of pixels.

14. The method as recited in claim 9, wherein the memory includes a database and further comprising the association of an identity with a quantized representation of the fingerprint image in the database.

15. A computer program product for processing fingerprints comprising a computer useable medium including a computer readable program, wherein the computer readable program when executed on a computer causes the computer to perform the steps of claim 9.

16. A computer program product for processing fingerprints comprising a computer useable storage medium including a computer readable program, wherein the computer readable program when executed on a computer causes the computer to perform the steps of:
   representing each minutiae in a fingerprint by determining quantized Gabor coefficients to represent texture content of the minutiae;
   computing a distance between represented minutiae and stored minutiae; and
   ranking matches based on the distance to identify the fingerprint.

17. A system for processing fingerprints, comprising:
   an input device configured to receive fingerprint images;
   an extraction module configured to determine minutiae in the fingerprint;
   a representation module configured to compute Gabor coefficients to represent texture content for each minutiae to represent the fingerprint; and
   a comparing module for computing a distance between represented minutiae in the fingerprint and stored minutiae in memory to rank matches based on the distance to associate an identify with the fingerprint.

18. The system as recited in claim 17, wherein computing includes computing a Hamming distance.

19. The system as recited in claim 17, wherein the Gabor coefficients are optimized using a gradient descent approach.

20. The system as recited in claim 17, wherein the system is a scalable 1:N identification system.

* * * * *